United States Patent
Suzuki et al.

(10) Patent No.: US 10,632,562 B2
(45) Date of Patent: Apr. 28, 2020

(54) ELECTRODE FOR ELECTRIC RESISTANCE WELDING

(71) Applicants: Shoji Aoyama, Osaka (JP); TOYOTA JIDOSHA KABUSHIKI KAISHA, Aichi-ken (JP)

(72) Inventors: Jyunnichi Suzuki, Aichi-ken (JP); Takami Aramaki, Aichi-ken (JP); Kenji Ninomiya, Aichi-ken (JP); Hiromi Kudou, Aichi-ken (JP); Yoshitaka Aoyama, Sakai (JP); Shoji Aoyama, Osaka (JP)

(73) Assignees: Shoji Aoyama, Osaka (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 302 days.

(21) Appl. No.: 15/657,507

(22) Filed: Jul. 24, 2017

(65) Prior Publication Data
US 2018/0036829 A1    Feb. 8, 2018

(30) Foreign Application Priority Data
Aug. 8, 2016    (JP) .................................. 2016-155585

(51) Int. Cl.
*B23K 11/30*    (2006.01)
*B23K 11/00*    (2006.01)

(52) U.S. Cl.
CPC ...... *B23K 11/3054* (2013.01); *B23K 11/0046* (2013.01); *B23K 11/3009* (2013.01); *B23K 11/3036* (2013.01)

(58) Field of Classification Search
CPC .............................. B23K 11/3054; B23K 11/00
(Continued)

(56) References Cited

U.S. PATENT DOCUMENTS 4,623,775 A * 11/1986 Lange ................ B23K 11/3009
                                                                    219/119
6,008,463 A * 12/1999 Aoyama .............. B23K 11/004
                                                                    219/119
(Continued)

FOREIGN PATENT DOCUMENTS

CN    1181724    5/1998
JP    52-018991    4/1977
(Continued)

OTHER PUBLICATIONS

Chinese Office Action dated Apr. 30, 2019 in corresponding Chinese Patent Application No. 201710666312.X with English Translation of Search Report.

(Continued)

*Primary Examiner* — Serkan Akar
*Assistant Examiner* — Ahmad Abdel-Rahman
(74) *Attorney, Agent, or Firm* — Wenderoth, Lind & Ponack, L.L.P.

(57) ABSTRACT

A sliding member integrated with a guide pin is inserted into a guide hole of an electrode main body. An elastic ring is integrated with the guide pin under a state in which the guide pin passes through the elastic ring. A portion of the sliding member has a pressurizing end surface configured to press the elastic ring against an inner end surface of the guide hole. When the pressurizing end surface presses the elastic ring against the inner end surface, flow of the cooling air is interrupted. When the elastic ring is away from the inner end surface, the cooling air is allowed to flow.

2 Claims, 6 Drawing Sheets

(58) Field of Classification Search
USPC .......................................................... 219/120
See application file for complete search history.

(56) References Cited

U.S. PATENT DOCUMENTS

| | | | | |
|---|---|---|---|---|
| 6,875,946 B2* | 4/2005 | Hidaka | .................. | B23K 11/14 |
| | | | | 219/86.41 |
| 9,211,604 B2* | 12/2015 | Ikoma | .................. | B23K 11/002 |
| 2005/0284847 A1* | 12/2005 | Aoyama | .................. | B23K 9/20 |
| | | | | 219/93 |

FOREIGN PATENT DOCUMENTS

| | | |
|---|---|---|
| JP | 52-15523 | 7/1977 |
| JP | 53-130582 | 10/1978 |
| JP | 59-77576 | 5/1984 |
| JP | 9-300081 | 11/1997 |
| JP | 09-300081 | 11/1997 |
| JP | 3130582 | 3/2007 |
| JP | 4023702 | 12/2007 |
| JP | 2010-253547 | 11/2010 |
| JP | 2015-74030 | 4/2015 |

OTHER PUBLICATIONS

Japanese Notice of Reasons for Refusal dated May 2, 2018 in corresponding Japanese Patent Application No. 2016-155585 with English translation.

* cited by examiner

FIG. 1(A)
FIG. 1(B)
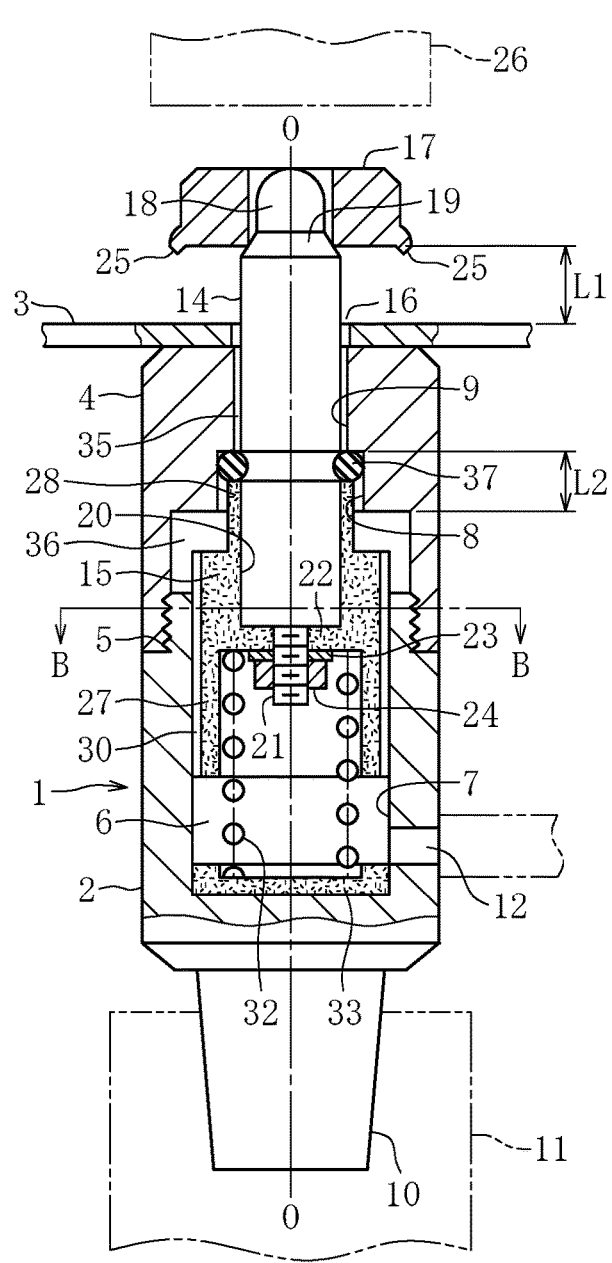
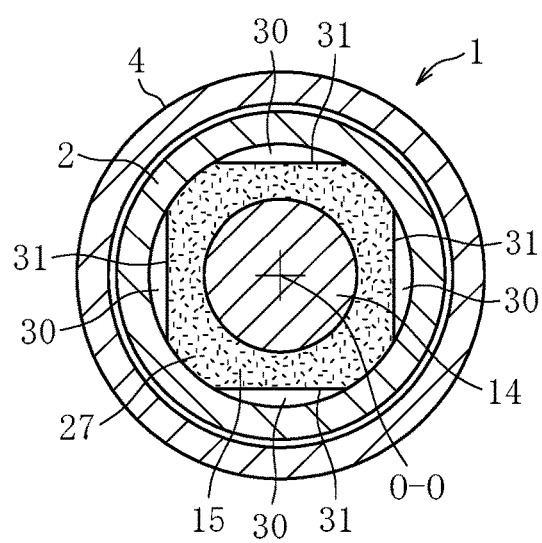

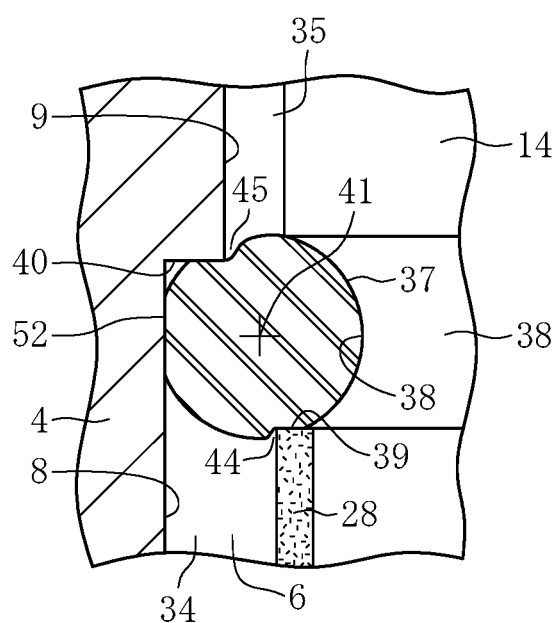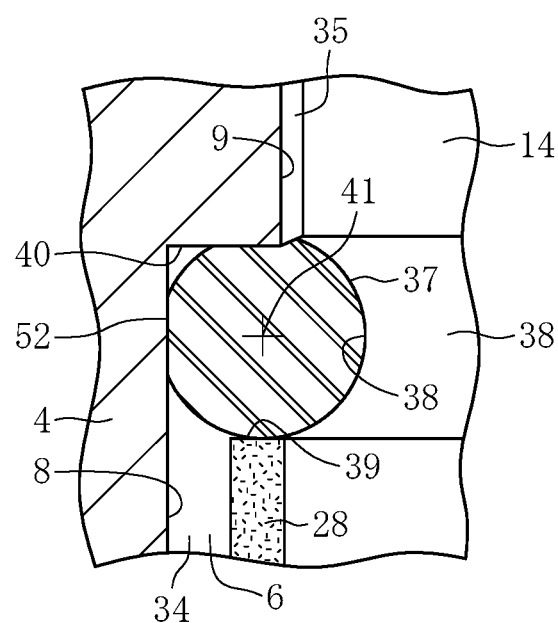

ELECTRODE FOR ELECTRIC RESISTANCE WELDING

TECHNICAL FIELD

The present invention relates to an electrode for electric resistance welding including a sliding member made of a synthetic resin integrated with a guide pin made of a metal material or the like so that flow control for cooling air introduced into an electrode main body is reliably performed based on an advancing and retreating operation of such integrated-structure portion.

BACKGROUND ART

In the related art disclosed in Japanese Patent No. 4023702, an air passage is formed inside an electrode by combining a plurality of members. An O-ring is used so as to prevent cooling air from leaking outside from the air passage.

CITATION LIST

Patent Literature 1: JP 4023702

SUMMARY OF INVENTION

Technical Problem

For an electrode including a guide pin projecting from an electrode main body and a sliding member fitted into a guide hole of the electrode main body, which advance and retreat under an integrated state so that the cooling air is fed from back of the sliding member, flow and sealing of the cooling air are required to be reliably performed. Although it is disclosed in Japanese Patent No. 4023702 that the cooling air is prevented from leaking outside from the air passage formed in the electrode, flow control for the cooling air, specifically, control of the flow and sealing of the cooling air based on an advancing and retreating operation of the guide pin and the sliding member is not taken into consideration.

The present invention has been made to solve the problem described above, and has an object to provide an electrode for electric resistance welding capable of reliably sealing cooling air and allowing the cooling air to flow based on an advancing and retreating operation of an integrated-structure portion obtained by integrating a sliding member made of a synthetic resin with a guide pin made of a metal material or the like.

Solution to Problem

According to one embodiment of the present invention, there is provided an electrode for electric resistance welding, comprising: a guide pin having a circular cross section, which projects from an end surface of an electrode main body to pass through a pilot hole formed in a steel sheet part, and is made of a heat-resistant hard material comprising a metal material or a ceramic material; a sliding member having a circular cross section, which is integrated with the guide pin, is slidably fitted into a guide hole formed in the electrode main body, and is made of an insulating synthetic resin material; a ventilation port formed in the electrode main body, which is configured to introduce cooling air for exhausting impurities and for cooling into the guide hole; and an elastic ring made of an elastic material to be integrated with the guide pin under a state in which the guide pin passes through the elastic ring, wherein the sliding member comprises a pressurizing end surface, which is formed at a portion of the sliding member, and is configured to press the elastic ring against an inner end surface of the guide hole, and wherein flow of the cooling air is interrupted when the pressurizing end surface presses the elastic ring against the inner end surface, whereas the cooling air is allowed to flow when the elastic ring is away from the inner end surface.

Advantageous Effects of Invention

The elastic ring made of the elastic material and integrated with the guide pin is pressed against the inner end surface of the guide hole by the pressurizing end surface. Therefore, the elastic ring is placed in a clamped state between the inner end surface and the pressurizing end surface, so that flow gaps for the cooling air formed between the sliding member and the guide hole and between the guide pin and the guide hole are closed by the elastic ring. Thus, when the guide pin projects from the end surface of the electrode main body so that a welding operation is not performed, the flow of the cooling air is completely interrupted, so that the cooling air can be reliably prevented from leaking to a downstream side of the flow gap. As a result, waste of compressed air is prevented, and hence an economical electrode is obtained.

The elastic ring is placed in the clamped state between the inner end surface and the pressurizing end surface. Therefore, the elastic ring is compressed in a center axis direction of the electrode to come into close contact with the inner end surface and the pressurizing end surface over a large area and to be strongly pressed against the inner end surface and the pressurizing end surface. Therefore, the flow gaps for the cooling air formed between the sliding member and the guide hole and between the guide pin and the guide hole are reliably blocked with high airtightness. As a result, air leakage is completely prevented.

As described above, when the elastic ring is in the clamped state between the inner end surface and the pressurizing end surface, in other words, when the inner end surface, the elastic ring, and the pressurizing end surface are arranged in the same straight line in the center axis direction of the electrode, an outer surface of the elastic ring comes into close contact with the inner end surface and the pressurizing end surface. When the clamping is performed with a positional relationship in which the inner end surface and the pressurizing end surface are shifted in a diameter direction of the electrode, an angular portion of the guide hole of the electrode main body bites into the outer surface of the elastic ring. Under the bitten state, the flow gaps for the cooling air are blocked. Therefore, even in the case where the inner end surface and the pressurizing end surface are shifted from each other as described above, reliable air leakage prevention is achieved.

Meanwhile, when the guide pin is pushed down together with the sliding member to perform the welding operation, the elastic ring is moved away from the inner end surface of the guide hole. Therefore, the flow gaps for the cooling air are opened. With an air flow generated by opening the flow gaps, impurities such as spatter are exhausted and each of the portions of the electrode is cooled. As a result, a temperature state of the electrode can be kept normal. At the same time, the elastic ring itself made of the elastic material comprising the non-metal material which is liable to be affected by heat is cooled by the cooling air. Therefore, durability of the elastic ring can be maintained over a long period of time.

BRIEF DESCRIPTION OF DRAWINGS

FIG. 1A and FIG. 1B are sectional views of portions of an electrode.

FIG. 2A and FIG. 2B are enlarged sectional views for illustrating a deformed state of an elastic ring under pressure.

DESCRIPTION OF EMBODIMENTS

Figure 3:
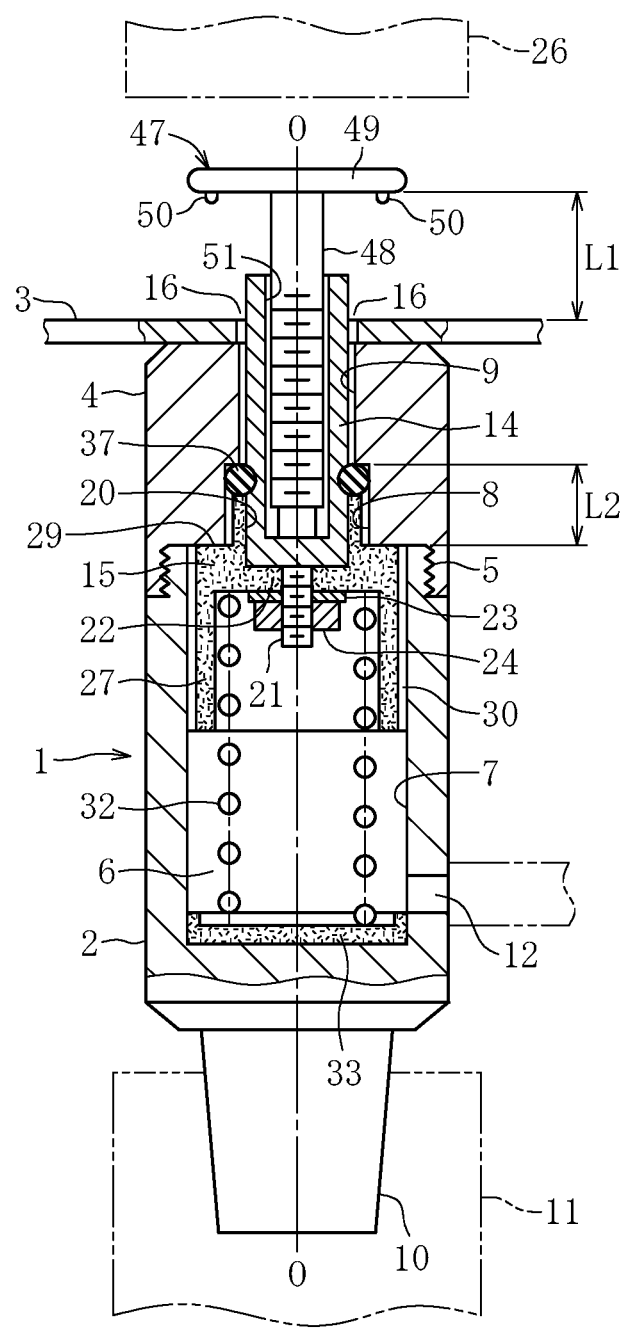
FIG. 3 is a sectional view for illustrating a modification example.

A mode for carrying out the present invention relating to an electrode for electric resistance welding is now described.

Embodiment

An embodiment of the present invention is illustrated in FIG. 1A to FIG. 6.

First, an electrode main body is described.

An electrode main body 1 made of a copper alloy has a cylindrical shape, and comprises a fixed portion 2 to be inserted into a stationary member 11 and a cap portion 4 on which a steel sheet part 3 is placed. The fixed portion 2 and the cap portion 4 are coupled to each other at a thread portion 5. The electrode main body 1 has a guide hole 6 having a circular cross section formed therein. The guide hole 6 comprises a large-diameter hole 7, a small-diameter hole 8 formed in a center portion of the cap portion 4, and a communication hole 9 which has a diameter smaller than a diameter of the small-diameter hole 8 and has an opening on an upper surface of the electrode main body 1.

A tapered portion 10 is formed below the fixed portion 2. The tapered portion 10 is fitted into a tapered hole formed in the stationary member 11. A ventilation port 12 configured to introduce compressed air into the guide hole 6 is formed in a side portion of the fixed portion 2. A center axis of an electrode is illustrated as the line O-O.

Next, a sliding member is described.

A guide pin 14 is made of a heat-resistant hard material comprising a metal material such as stainless steel or a ceramic material. A sliding member 15 is made of an insulating synthetic resin excellent in heat resistance, for example, polytetrafluoroethylene (Teflon (trademark)). The guide pin 14 is integrated with the sliding member 15 under a state of being inserted into the sliding member 15. The guide pin 14 and the sliding member 15 both have a circular cross section. The guide pin 14 passes relatively through a pilot hole 16 formed in the steel sheet part 3 to fulfill a function of positioning the steel sheet part 3, and supports a projection nut 17 made of iron fitted over a distal end portion of the guide pin 14. For this purpose, a small-diameter portion 18 and a tapered portion 19 to be inserted into a thread hole of the projection nut 17 are formed. In the following description, the projection nut is also referred to simply as "nut".

The guide pin 14 is integrated with the sliding member 15 under a state of being inserted into the sliding member 15, as described above. As an integrating method, various methods such as screwing and resin injection insert molding can be used. In this case, the screwing method is used. The sliding member 15 is fitted into the large-diameter hole 7 under a slidable state with substantially no gap therebetween. An insertion hole 20 is formed in the sliding member 15, and the guide pin 14 is press-fitted therein. A bolt 21 is formed at an end portion of the guide pin 14 in an integrated manner therewith. The bolt 21 is caused to pass through a bottom member 22 of the sliding member 15. After a washer 23 is assembled to the bolt 21, a lock nut 24 is tightened.

The nut 17 has the thread hole formed in a center portion of a rectangular main body. Welding projections 25 are formed at four corners of the main body. The electrode main body 1 is a fixed electrode. A movable electrode 26 is arranged in a coaxial state with the electrode main body 1. The sliding member 15 fulfills an insulating function so that, when the movable electrode 26 operates to allow a welding current to flow therethrough, the current flows from the welding projections 25 of the nut 17 only to the steel sheet part 3.

A cross section of FIG. 1A taken along the line B-B is illustrated in FIG. 1B.

Next, insertion structures of the sliding member and the guide pin are described.

As described above, the sliding member 15 is fitted into the large-diameter hole 7 under a slidable state with substantially no gap therebetween. A portion fitted into the large-diameter hole 7 is a sliding portion 27 having a large diameter. A portion extended continuously from the sliding portion 27 is an extended portion 28 having a tubular shape, and is inserted into the small-diameter hole 8.

As illustrated in FIG. 1B, air passages 30 for cooling air are formed between an outer peripheral surface of the sliding portion 27 and an inner peripheral surface of the electrode main body 1 in the center axis O-O direction of the electrode main body 1. Various structures can be used as the air passages 30. In this case, as illustrated in FIG. 1A and FIG. 1B, the air passages 30 are formed by forming four plane portions 31 at intervals of 90 degrees on the outer peripheral surface of the sliding member 15 (sliding portion 27). Instead, although not illustrated, a plurality of recessed grooves may be formed in the outer peripheral surface of the sliding member 15 in the center axis O-O direction to form the air passages 30.

The guide pin 14 passes through the communication hole 9 to project from an end surface of the electrode main body 1. In a stage before forward movement of the movable electrode 26, specifically, in a stage in which an elastic ring 37 closes flow gaps for cooling air described later, an air gap having an axial length L1 is formed between the nut 17 locked to the tapered portion 19 and the steel sheet part 3.

A compression coil spring 32 is fitted between the sliding member 15 and an inner bottom surface of the guide hole 6, and a pressing force thereof is exerted on the sliding member 15. An insulating sheet 33 is fitted onto the inner bottom surface of the guide hole 6. In place of the pressing force of the compression coil spring 32, an air pressure introduced from the ventilation port 12 can also be used.

Next, the flow gaps are described.

The cooling air fed from the ventilation port 12 to the guide hole 6 passes from the air passages 30 formed between the sliding portion 27 and the large-diameter hole 7 through a flow gap 34 (see FIG. 2A) formed between the extended portion 28 and the small-diameter hole 8 and an elastic ring described later. After passing through a flow gap 35 (see FIG. 2A) formed between the guide pin 14 and the communication hole 9, the cooling air reaches welded portions of the welding projections 25 from the pilot hole 16. Although the flow gaps 34 and 35 are illustrated as the flow gaps, the air passages 30 formed by the plane portions 31 are also present as air gaps serving as the flow gaps.

An annular space portion 36 is a space configured to allow the sliding portion 27 to advance and retreat therein. An inner diameter of the space portion 36 is set larger than an inner diameter of the small-diameter hole 8.

Next, the elastic ring is described.

On a path in which the cooling air flowing from the ventilation port 12 passes through the flow gaps 30, 34, and 35 to exit through the pilot hole 16, the elastic ring 37 is provided so as to close or open an air flow path.

Although various shapes comprising a circle, an ellipsoid, and a rectangular can be used as a sectional shape of the elastic ring 37, the circular cross section is used in this case as illustrated in FIG. 2A and FIG. 2B. The elastic ring 37 is made of a non-metal material having elasticity. As representative materials, a synthetic rubber is suitable, and a urethane rubber is most suitable.

A groove 38 having an arc-like cross section is formed in an outer peripheral surface of the guide pin 14 over a circumferential direction, and the elastic ring 37 is fitted into the groove 38. For stronger tightening provided by the fitting, a diameter size of a minimum diameter portion of the groove 38 is set larger than an inner diameter size of a minimum diameter portion of the elastic ring 37 on a cross section perpendicular to the center axis O-O direction. In this manner, the elastic ring 37 is placed in a state of tightening the groove 38, thereby achieving firm integrity of the elastic ring 37 and the guide pin 14. When the sectional shape of the elastic ring 37 is changed as described above, the sectional shape of the groove 38 is changed correspondingly.

A maximum outer diameter size of the elastic ring 37 fitted into the groove 38 is set slightly larger than an inner diameter size of the small-diameter hole 8. In this manner, a pressure-contact portion 52 illustrated in FIG. 2A and FIG. 2B is formed. The pressure-contact portion 52 is a cylindrical surface formed by elastic deformation of an outer peripheral portion of the elastic ring 37 pressed against an inner surface of the small-diameter hole 8.

As illustrated in FIG. 2A, an end surface of the extended portion 28 of the sliding member 15 is formed as a pressurizing end surface 39, and is held in contact with an outer peripheral surface of the elastic ring 37 fitted into the groove 38. Specifically, a relative position of the groove 38 and the pressurizing end surface 39 is set so that the pressurizing end surface 39 is held in contact with a surface of the elastic ring 37 fitted into the groove 38. The pressurizing end surface 39 is present on an imaginary plane having a positional relationship perpendicular to the center axis O-O. A pressurizing force of the pressurizing end surface 39 is a combination of the pressing force of the compression coil spring 32 and the air pressure of the cooling air introduced from the ventilation port 12.

Figure 4A:
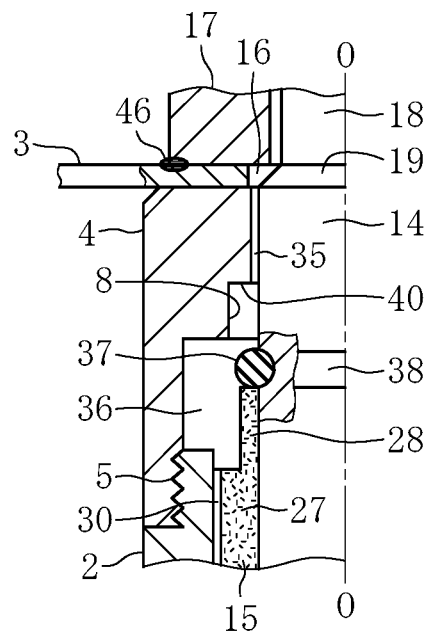
FIG. 4A, FIG. 4B, and FIG. 4C are sectional views, each for illustrating a state of formation of flow passages for cooling air.

Meanwhile, as illustrated in FIG. 2A and FIG. 4A, an inner end surface 40 of the guide hole 6 has such a positional relationship as to be opposed to the pressurizing end surface 39. A center portion 41 of the elastic ring 37 is positioned between the pressurizing end surface 39 and the inner end surface 40 which are opposed to each other. Specifically, the inner end surface 40, the elastic ring 37, and the pressurizing end surface 39 are arranged in the same straight line in the center axis O-O direction.

The groove 38 described above can be eliminated by increasing a tightening force of the elastic ring 37.

As illustrated in FIG. 4A, when the guide pin 14 is pushed down by forward movement of the movable electrode 26, the elastic ring 37 is moved out of the small-diameter hole 8 to ensure a flow path area for the cooling air. For this purpose, the inner diameter of the space portion 36 is set larger than the inner diameter of the small-diameter hole 8. At the same time, an axial length L2 of the small-diameter hole 8 is set smaller than the axial length L1 of the air gap described above (L1>L2).

Figure 4B:
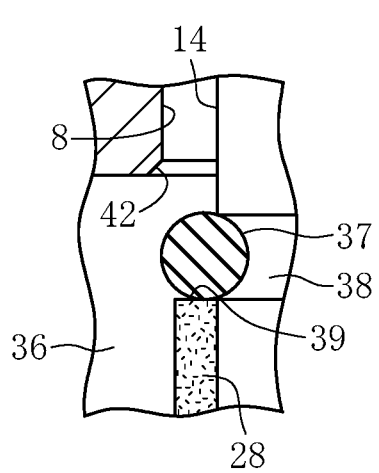
Figure 4C:
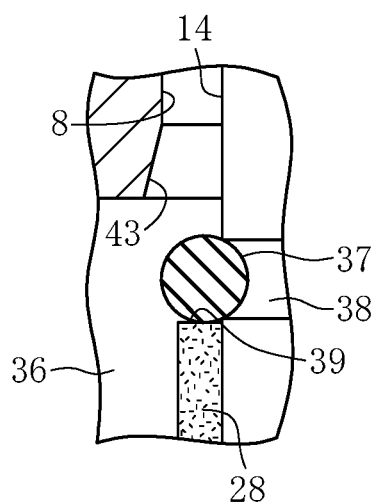

If the amount of eccentricity of the sliding member 15 becomes excessively large due to some reason when the elastic ring moved out of the small-diameter hole 8 returns into the small-diameter hole 8, the elastic ring 37 comes into contact with an angular portion of an opening of the small-diameter hole 8 to result in a fear of damage to the surface of the elastic ring 37. In consideration of such a situation, a processed slope portion 42 formed by processing called chamfer is formed at the angular portion of the opening of the small-diameter hole 8 as illustrated in FIG. 4B, or a tapered portion 43 is formed on an opening portion of the small-diameter hole 8 as illustrated in FIG. 4C.

A state illustrated in FIG. 2B is an example of a case where the center portion 41 of the elastic ring 37 is not positioned between the pressurizing end surface 39 and the inner end surface 40 as viewed in the center axis O-O direction. Specifically, the inner end surface 40 is shifted from the pressurizing end surface 39 in a diameter direction (outer periphery direction) of the electrode to be positioned diagonally opposite to the pressurizing end surface 39. Even in such a case, the flow gaps 34 and 35 are interrupted or brought into communication with each other by the elastic ring 37. When the pressurizing end surface 39 and the inner end surface 40 are shifted from each other in the diameter direction as illustrated in FIG. 2B, deformed portions 44 and 45 are formed by bite of an angular portion of the extended portion 28 and an angular portion of the communication hole 9 into the elastic ring 37. The bitten portions fulfill an airtightness maintaining function. Even when the bitten state is achieved, the elastic ring 37 is still held in close contact with the pressurizing end surface 39 and the inner end surface 40 although a close contact area is reduced.

Further, in the case illustrated in FIG. 2A, the elastic ring 37 is pressed against the inner end surface 40 by the pressurizing end surface 39. Thus, the elastic ring 37 is compressed between the pressurizing end surface 39 and the inner end surface 40.

Therefore, two modes in which the pressurizing end surface 39 presses the elastic ring 37 against the inner end surface 40 are achieved as illustrated in FIG. 2A and FIG. 2B.

Next, a modification example is described.

With the electrode described above, the projection nut 17 is welded to the steel sheet part 3. With a similar electrode structure, however, a projection bolt can be welded. A specific example thereof is illustrated in FIG. 3. In the following description, the projection bolt is also referred to simply as "bolt". A bolt 47 includes a shaft portion 48, a flange 49, and welding projections 50.

The guide pin 14 in this case is a hollow pin having a receiving hole 51 formed therein. The shaft portion 48 is inserted into the receiving hole 51. A length of the shaft portion 48 is set larger than a depth of the receiving hole 51.

Therefore, under a state before the forward movement of the movable electrode 26, the air gap having the axial length L1 is formed between the flange 49 and the steel sheet part 3. Similarly to the embodiment described above, L1>L2 is also satisfied in this case. The guide hole 6 in this case fulfills the function of the annular space portion 36 described above. The inner diameter of the small-diameter hole 8 is smaller than an inner diameter of the guide hole 6. The remaining configuration including unillustrated portions is the same as that of the above-mentioned embodiment using the nut, and members having similar functions are denoted by the same reference symbols.

In the modification example illustrated in FIG. 3, a radial end surface of the sliding member 15 formed at an intermediate portion is held in close contact with a radial end surface of the cap portion 4 at a seating portion 29. The close contact is maintained with the pressing force of the compression coil spring 32. The elastic ring 37 is compressed under this state to fulfill the airtight function. Specifically, an axial length of the extended portion 28 and an axial length of the small-diameter hole 8 are set so that the amount of compression (elastic deformation amount) of the elastic ring 37 becomes an appropriate value.

Next, another modification example is described.

In the electrode described above, the sliding member 15 comprises the extended portion 28. The elastic ring 37 is clamped between the pressurizing end surface 39 and the inner end surface 40 as illustrated in FIG. 2A. Or, the deformed portions 44 and 45 are formed by the bite of the angular portion of the extended portion 28 and the angular portion of the communication hole 9 into the elastic ring 37 as illustrated in FIG. 2B.

Figure 5:
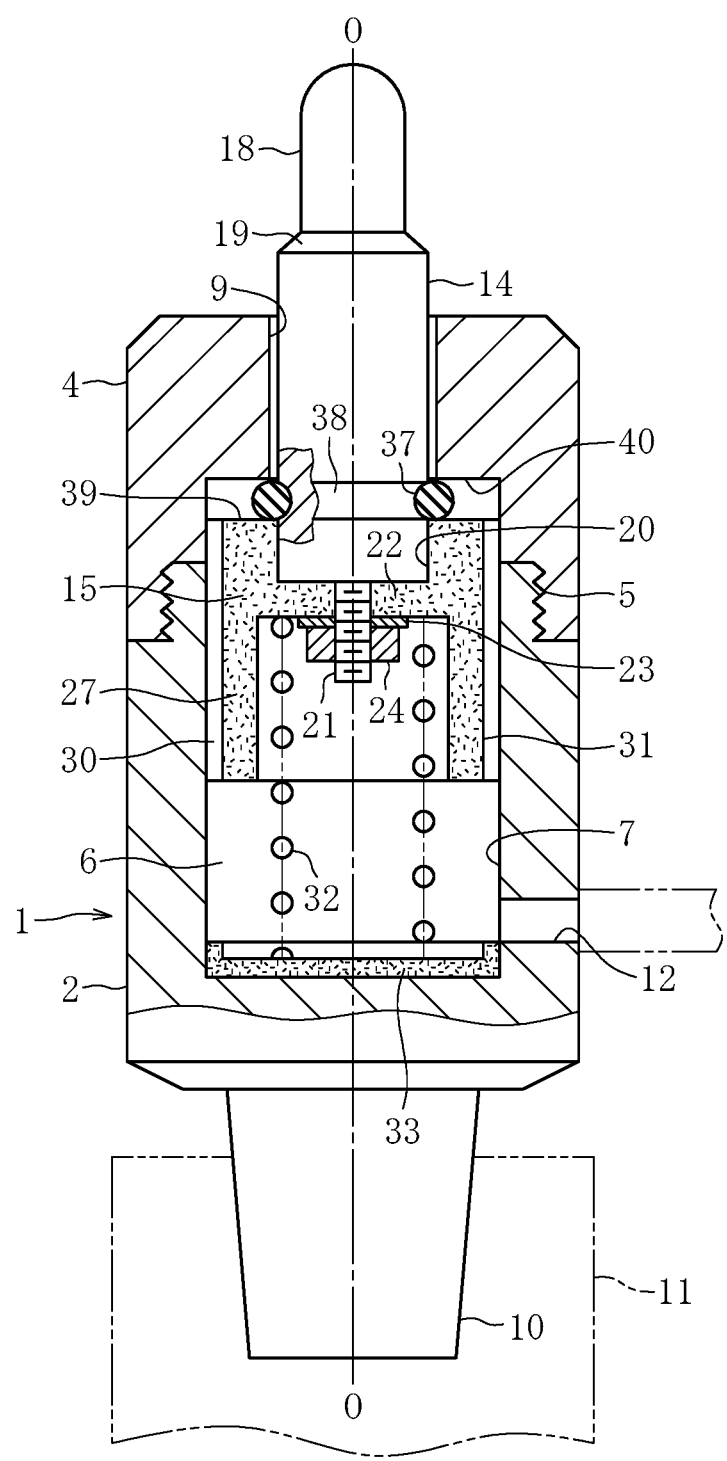
FIG. 5 is a sectional view for illustrating another modification example.

In a modification example illustrated in FIG. 5, the extended portion 28 as described above in the embodiment is not provided. Further, a difference in diameter provided as the large-diameter hole 7 and the small-diameter hole 8 in the embodiment described above is not provided to the guide hole 6. Therefore, an upper surface of the sliding member 15 is formed as the pressurizing end surface 39, whereas an upper end surface of the guide hole 6 is formed as the inner end surface 40. The remaining configuration including unillustrated portions is the same as those of the embodiment with the nut and the embodiment with the bolt described above. Members having similar functions are denoted by the same reference symbols.

Next, a further modification example is described.

Figure 6:
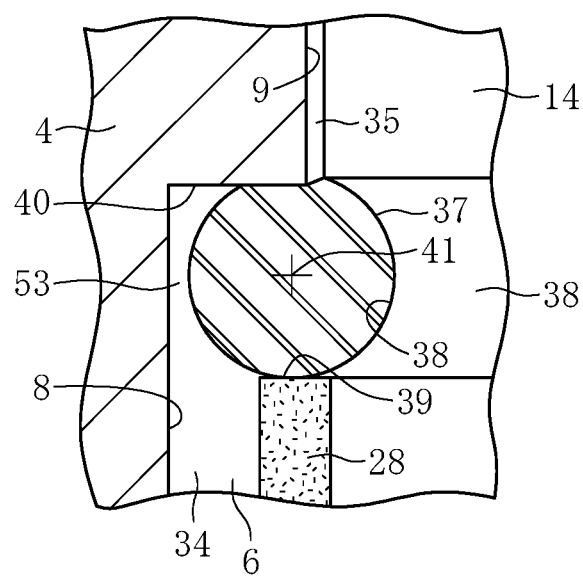
FIG. 6 is a sectional view for illustrating a further modification example.

As illustrated in FIG. 6, in this modification example, in place of the pressure-contact portion 52 described above, a clearance 53 is formed between the outer peripheral portion of the elastic ring 37 and an inner surface of the small-diameter hole 8. In this manner, when the elastic ring 37 is moved away from the inner end surface 40, the air passage from the flow gap 34 to the flow gap 35 is immediately opened regardless of the above-mentioned magnitude relationship between L1 and L2. The remaining configuration including unillustrated portions is the same as that of each of the modification examples described above. Members having similar functions are denoted by the same reference symbols.

Next, flow control for the cooling air is described.

In FIG. 1A and FIG. 1B, the elastic ring 37 is placed in the state illustrated in FIG. 2A or FIG. 2B by the pressing force of the compression coil spring 32, and a flow path from the flow gap 34 to the flow gap 35 is interrupted. Therefore, the flow of the cooling air introduced from the ventilation port 12 is interrupted by a sealing operation of the elastic ring 37, and therefore the cooling air does not leak from the flow gap 35 to the outside of the electrode main body 1.

Next, when the movable electrode 26 is moved forward, the guide pin 14 is pressed down so that the elastic ring 37 is moved down while sliding against the inner surface of the small-diameter hole 8. Then, when the welding projections 25 are pressed against the steel sheet part 3, the elastic ring 37 stops at a position after moving out of the small-diameter hole 8 based on the relationship L1>L2 and the larger inner diameter of the space portion 36 than the inner diameter of the small-diameter hole 8 as illustrated in FIG. 4A. Under this state, the nut 17 and the steel sheet part 3 are pressurized between the movable electrode 26 and the electrode main body 1. The welding current is caused to flow to achieve welding.

Under the stopped state described above, the ventilation port 12, the large-diameter hole 7, the flow gaps 30 being the air passages, the space portion 36, the small-diameter hole 8, the flow gap 35, and the pilot hole 16 forma series of air passages. Welding heat generated from the welded portions of the welding projections 25 is cooled by the cooling air flowing through the series of air passages. At the same time, impurities such as spatter entering through the flow gap 35 are exhausted. A welded portion 46 is represented as a black portion in FIG. 4A.

Thereafter, after the movable electrode 26 is retreated, the steel sheet part 3 welded with the nut is removed. Then, the sliding member 15 and the guide pin 14 are pushed back by the pressing force of the compression coil spring 32 to return the elastic ring 37 to a position illustrated in FIG. 2A or a position illustrated in FIG. 2B to interrupt the flow of the cooling air. Then, the subsequent steel sheet part 3 is placed, and the nut 17 is placed on the guide pin 14.

Although the operation of the flow control described above is performed in the embodiment illustrated in FIG. 1A, FIG. 1B, FIG. 2A, and FIG. 2B, the operation of the flow control is substantially the same even in the modification examples illustrated in FIG. 3, FIG. 5, and FIG. 6.

Functions and effects of the embodiment described above are as follows.

The elastic ring 37 made of the elastic material, which is integrated with the guide pin 14, is pressed against the inner end surface 40 of the small-diameter hole 8, or the inner end surface 40 of the guide hole 6, by the pressurizing end surface 39. Hence, the elastic ring 37 is placed in the clamped state between the inner end surface 40 and the pressurizing end surface 39. Therefore, the flow gaps 30, 34, and 35 for the cooing air, which are formed between the sliding member 15 and the guide hole 6 and between the guide pin 14 and the guide hole 6, are closed by the elastic ring 37. When the guide pin 14 projects from the end surface of the electrode main body 1 so that the welding operation is not performed, the flow of the cooling air is completely interrupted. Thus, the cooling air can be reliably prevented from leaking to a downstream side of the flow gap 35 to prevent waste of the compressed air. As a result, an economical electrode is obtained.

The elastic ring 37 is placed in the clamped state between the inner end surface 40 and the pressurizing end surface 39. Therefore, the elastic ring 37 is compressed in the center axis O-O direction of the electrode to be brought into close contact with the inner end surface 40 and the pressurizing end surface 39 over a large area and to be strongly pressed against the inner end surface 40 and the pressurizing end surface 39. Therefore, the flow gap 34 for the cooling air, which is formed between the sliding member 15 and the guide hole 6, and the flow gap 35 for the cooling air, which is formed between the guide pin 14 and the guide hole 6, are reliably blocked with high airtightness, and hence air leakage is completely prevented. When the elastic ring 37 is clamped between the pressurizing end surface 39 and the inner end surface 40, the elastic ring 37 is squashed to expand outward in the diameter direction. Pressure contact of the elastic ring 37 (see the pressure-contact portion 52 illustrated in FIG. 2A and FIG. 2B) with the inner surface of the small-diameter hole 8 is obtained to further improve sealability.

Through the above-mentioned pressure contact of the pressure-contact portion 52 with the inner surface of the small-diameter hole 8, and the fitting of the sliding member 15 into the guide hole 6 under a slidable state, a member obtained by integrating the guide pin 14 and the sliding member 15 is supported at two positions. Therefore, even when an external force in the diameter direction is exerted on a portion in a vicinity of a distal end of the guide pin 14, an inclining displacement of the guide pin 14 is remarkably reduced. As a result, disturbance of the relative position between the electrode main body 1 and the steel sheet part 3 is minimized.

As described above, when the elastic ring 37 is in the clamped state between the inner end surface 40 and the pressurizing end surface 39, in other words, when the inner end surface 40, the elastic ring 37, and the pressurizing end surface 39 are arranged in the straight line in the center axis O-O direction of the electrode, the outer surface of the elastic ring 37 comes into close contact with the inner end surface 40 and the pressurizing end surface 39 over a large area. On the other hand, when the clamping is performed by the inner end surface 40 and the pressurizing end surface 39 in a positional relationship in which the inner end surface 40 and the pressurizing end surface 39 are shifted in the diameter direction of the electrode, the outer surface of the elastic ring 37 is held in close contact with the inner end surface 40 and the pressurizing end surface 39 over a small area under a state in which the angular portion of the guide hole 6 of the electrode main body 1 bites into the outer surface of the elastic ring 37. By the bite and the close contact state over the small area, the flow gaps 34 and 35 for the cooling air are blocked. Therefore, even when the inner end surface 40 and the pressurizing end surface 39 are shifted in the diameter direction as described above, reliable air leakage prevention is achieved.

As described above, when the elastic ring 37 is in the clamped state between the inner end surface 40 and the pressurizing end surface 39, the outer surface of the elastic ring 37 comes into close contact with the inner end surface 40 and the pressurizing end surface 39. However, when the elastic ring 37 is clamped by the inner end surface 40 and the pressurizing end surface 39 being shifted in an oblique direction from each other, the angular portion of the guide hole 6 of the electrode main body 1 bites into the outer surface of the elastic ring 37. Under the bitten state, the flow gaps 34 and 35 for the cooling air are blocked. Therefore, even when the inner end surface 40 and the pressurizing end surface 39 are shifted in this manner, a strong airtightness maintaining function at the bitten portion becomes dominant so that the reliable air leakage prevention is achieved.

Meanwhile, when the guide pin 14 is pushed down together with the sliding member 15 so as to perform the welding operation, the elastic ring 37 is separated away from the inner end surface 40 of the guide hole 6. Therefore, the flow gaps 34 and 35 for the cooling air are opened. With an air flow generated by opening the flow gaps 34 and 35, the impurities such as spatter are exhausted and each of the portions of the electrode is cooled. As a result, a temperature state of the electrode is kept normal. At the same time, the elastic ring 37, which is made of the non-metal elastic member liable to be affected by the heat, is cooled by the cooling air. Therefore, durability of the elastic ring 37 can be maintained over a long period of time.

The elastic ring 37 is clamped between the inner end surface 40 of the guide hole 6 and the pressurizing end surface 39. Therefore, the outer periphery side of the elastic ring 37 can be expanded to be pressed against the inner surface of the small-diameter hole 8 or the inner surface of the guide hole 6 (see the press-contact portion 52 illustrated in FIG. 2A and FIG. 2B). Through utilization of the pressing against the outer periphery side as described above, the airtightness maintaining function fulfilled by the elastic ring 37 can be further enhanced. As a result, the economic electrode without air leakage is obtained.

As illustrated in FIG. 2A or FIG. 4A, the positional relationship is such that the inner end surface 40 of the guide hole 6 is opposed to the pressurizing end surface 39. The center portion 41 of the elastic ring 37 is positioned between the pressurizing end surface 39 and the inner end surface 40 which are opposed to each other. Through arrangement of the center portion 41 of the cross section of the elastic ring 37 between the inner end surface 40 of the guide hole 6 and the pressurizing end surface 39 as described above, the elastic ring 37 is clamped between the inner end surface 40 and the pressurizing end surface 39 under a stable state. Therefore, a force component for shifting the position of the elastic ring 37 in the diameter direction of the electrode is not generated along with the clamping described above, and the deformation of the elastic ring 37 suitable for maintaining airtightness is obtained.

On the other hand, as illustrated in FIG. 2B, even when the inner end surface 40 is shifted from the pressurizing end surface 39 so that the center portion 41 of the elastic ring 37 is not present in a space which faces both the inner end surface 40 and the pressurizing end surface 39, a reliable airtight state can be ensured by the bite at the deformed portions 44 and 45.

In a case where the guide hole 6 comprises the large-diameter hole 7 into which the sliding member 15 is fitted and the small-diameter hole 8 into which the extended portion 28 is inserted, and the elastic ring 37 is moved into the small-diameter hole 8 to be pressed against the inner end surface 40 of the small-diameter hole 8, when the guide pin 14 is pushed down, the elastic ring 37 can be moved out of the small-diameter hole 8 so that the flow path for the cooling air can be ensured. In a case where the flow path for the cooling air is formed by the movement of the elastic ring 37 out of the small-diameter hole 8 described above, the flow path area of the flow path can be increased. Thus, a flow rate of the cooling air can be increased to enhance a cooling effect.

At the same time, when the elastic ring 37 which is out of the small-diameter hole 8 returns into the small-diameter hole 8, a return operation of the elastic ring 37 is smoothly performed by formation of the processed slope portion 42 of a chamfered slop or the guide tapered portion 43 at the angular portion of the opening of the small-diameter hole 8. As a result, the advancing and retreating operation of the guide pin 14 and the sliding member 15 is smoothed. In addition, the surface of the elastic ring 37 can be prevented from getting scratched, which is effective in improvement of the durability of the elastic ring 37.

The groove 38 is formed in the guide pin 14, and the elastic ring 37 is fitted therein. The relative position of the groove 38 and the pressurizing end surface 39 is set so that the pressurizing end surface 39 comes into contact with the elastic ring 37 under the fitted state. Through provision of the positional relationship between the groove 38 and the pressurizing end surface 39 described above, the degree of integrity of the elastic ring 37 with the guide pin 14 can be increased. At the same time, a pressing force from the pressurizing end surface 39 can be reliably exerted on the elastic ring 37. Thus, the elastic ring 37 can be reliably pressurized against the inner end surface 40.

INDUSTRIAL APPLICABILITY

As described above, according to the present invention, in the electrode for electric resistance welding, the sliding member made of the synthetic resin is integrated with the guide pin made of the metal material or the like. The cooling air is reliably sealed and allowed to flow by the advancing and retreating operation of the integrated-structure portion. Therefore, the electrode for electric resistance welding having good operation reliability is obtained, and can be used in a wide range of industrial field such as a vehicle body welding process for an automobile and a sheet-metal welding process for home appliance.

The invention claimed is:

1. An electrode for electric resistance welding, the electrode comprising:
    an electrode main body having a guide hole that comprises a large-diameter hole, a small-diameter hole having a diameter smaller than a diameter of the large-diameter hole, and a communication hole having a diameter smaller than a diameter of the small-diameter hole and opening at an end surface of the electrode main body;
    a guide pin having a circular cross section, which projects from the end surface of the electrode main body to pass through a pilot hole formed in a steel sheet part, and is made of a heat-resistant hard material comprising a metal material or a ceramic material;
    a sliding member having a circular cross section, which is made of an insulating synthetic resin material and is integrated with the guide pin, the sliding member comprising a sliding portion that is slidably fitted into the large-diameter hole of the guide hole and an extended portion that extends from the sliding portion into the small-diameter hole of the guide hole;
    a ventilation port formed in the electrode main body, which is configured to introduce cooling air for exhausting impurities and for cooling into the guide hole; and
    an elastic ring made of an elastic material to be integrated with the guide pin under a state in which the elastic ring is fitted into a circumferential groove formed in an outer peripheral surface of the guide pin and an outer peripheral surface of the elastic ring is in contact with an end surface of the extended portion of the sliding member,
    wherein the sliding member is configured to press the elastic ring with the end surface of the extended portion, as a pressurizing end surface, against an inner end surface of the small-diameter hole of the guide hole; and
    wherein flow of the cooling air from an air gap between the extended portion and the small-diameter hole to an air gap between the guide pin and the communication hole is interrupted when the pressurizing end surface presses the elastic ring against the inner end surface of the small-diameter hole, whereas the cooling air is allowed to flow from the air gap between the extended portion and the small-diameter hole to the air gap between the guide pin and the communication hole when the elastic ring is away from the inner end surface of the small-diameter hole.

2. An electrode for electric resistance welding according to claim 1, wherein the pressurizing end surface is opposed to the inner end surface of the small-diameter hole, and a center portion of the elastic ring is positioned between the pressurizing end surface and the inner end surface of the small-diameter hole.

* * * * *